(12) United States Patent
Graves et al.

(10) Patent No.: US 11,757,320 B2
(45) Date of Patent: Sep. 12, 2023

(54) ELECTRIC MOTOR ROTOR DISCHARGE PROTECTION

(71) Applicant: Tesla, Inc., Palo Alto, CA (US)

(72) Inventors: Scott Michael Graves, Felton, CA (US); Diego Alberto Silva Rodriguez, Cupertino, CA (US); Tyler Nils Grendahl, Waltham, MA (US); Alexander Hain, Frankfurt Höchst (DE)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 17/444,507

(22) Filed: Aug. 5, 2021

(65) Prior Publication Data

US 2021/0367467 A1 Nov. 25, 2021

Related U.S. Application Data

(60) Division of application No. 15/827,363, filed on Nov. 30, 2017, now Pat. No. 11,088,582, which is a
(Continued)

(51) Int. Cl.
*H02K 1/32* (2006.01)
*H02K 5/173* (2006.01)
(Continued)

(52) U.S. Cl.
CPC ............... *H02K 1/32* (2013.01); *H02K 1/16* (2013.01); *H02K 1/274* (2013.01); *H02K 3/12* (2013.01);
(Continued)

(58) Field of Classification Search
CPC ........ H02K 5/1732; H02K 11/40; H02K 5/08; H02K 7/083; H02K 7/14; H02K 1/276;
(Continued)

(56) References Cited

U.S. PATENT DOCUMENTS 3,629,627 A 12/1971 Dafler
6,191,511 B1 2/2001 Zysset
(Continued)

FOREIGN PATENT DOCUMENTS

CN 101578190 11/2009
CN 103079866 5/2013
(Continued)

OTHER PUBLICATIONS

International Search Report and Written Opinion; International Application No. PCT/US2017/036285; dated Jul. 17, 2017; 14 pgs.
(Continued)

*Primary Examiner* — Jose A Gonzalez Quinones
(74) *Attorney, Agent, or Firm* — Knobbe, Martens, Olson & Bear, LLP

(57) ABSTRACT

An electric motor includes a case, a stator having stator windings, a rotor having a rotor shaft, and at least one main rotor bearing coupling the rotor shaft to the case. Common mode charge builds up on the rotor due to imbalances of the stator. The at least one main rotor bearing has a first electrical resistance between the rotor shaft and the case. The electric motor further includes a rotor discharge bearing coupling the rotor shaft to the case. The rotor discharge bearing has a second electrical resistance between the rotor shaft and the case that is less than the first electrical resistance, causing the common mode charge to discharge through the rotor discharge bearing. In a differing embodiment, a rotor discharge brush coupled between the case and the rotor shaft along the longitudinal axis of the rotor shaft discharges the common mode charge.

10 Claims, 11 Drawing Sheets

Related U.S. Application Data continuation of application No. PCT/US2017/036300, filed on Jun. 7, 2017.

(60) Provisional application No. 62/346,741, filed on Jun. 7, 2016.

(51) Int. Cl.
| | |
|---|---|
| *H02K 7/08* | (2006.01) |
| *H02K 11/40* | (2016.01) |
| *H02K 9/193* | (2006.01) |
| *H02K 9/197* | (2006.01) |
| *H02K 1/16* | (2006.01) |
| *H02K 1/274* | (2022.01) |
| *H02K 3/12* | (2006.01) |
| *H02K 5/16* | (2006.01) |
| *H02K 11/00* | (2016.01) |

(52) U.S. Cl.
CPC .............. *H02K 5/16* (2013.01); *H02K 5/1732* (2013.01); *H02K 7/083* (2013.01); *H02K 9/193* (2013.01); *H02K 9/197* (2013.01); *H02K 11/40* (2016.01); *H02K 11/00* (2013.01)

(58) Field of Classification Search
CPC ...... H02K 1/278; H02K 1/28; H02K 11/0094; H02K 11/01; H02K 11/022
USPC ............................................ 310/68 R, 71, 90
See application file for complete search history.

(56) References Cited

U.S. PATENT DOCUMENTS

| | | | |
|---|---|---|---|
| 6,329,731 B1 | 12/2001 | Arbanas | |
| 6,360,835 B1 | 3/2002 | Skala | |
| 6,394,207 B1 | 5/2002 | Skala | |
| 7,156,195 B2 | 1/2007 | Yamagishi | |
| 7,789,176 B2 | 9/2010 | Zhou | |
| 7,841,431 B2 | 11/2010 | Hou | |
| 8,232,319 B2 | 1/2012 | Kohno | |
| 8,448,696 B2 | 5/2013 | Johnston | |
| 8,970,075 B2 | 3/2015 | Rippel | |
| 9,306,433 B2 | 4/2016 | Sten | |
| 10,128,705 B2 | 11/2018 | Yang | |
| 10,587,162 B2 | 3/2020 | Yang et al. | |
| 10,967,702 B2 | 4/2021 | Mancini | |
| 11,088,582 B2 | 8/2021 | Graves et al. | |
| 2002/0190598 A1* | 12/2002 | Bartman | H01R 39/12 310/219 |
| 2003/0057783 A1* | 3/2003 | Melfi | H02K 11/0141 310/68 R |
| 2004/0233592 A1* | 11/2004 | Oh | H02K 11/40 361/23 |
| 2005/0156471 A1 | 7/2005 | Kobayashi | |
| 2010/0001602 A1 | 1/2010 | Bossaller et al. | |
| 2010/0127585 A1* | 5/2010 | Fee | H02K 11/40 310/71 |
| 2010/0320850 A1 | 12/2010 | Lemmers, Jr. et al. | |
| 2011/0309697 A1 | 12/2011 | Kirkley, Jr. et al. | |
| 2011/0309698 A1 | 12/2011 | Kirkley, Jr. et al. | |
| 2012/0104884 A1 | 5/2012 | Wagner et al. | |
| 2012/0153718 A1 | 6/2012 | Rawlinson et al. | |
| 2012/0217756 A1 | 8/2012 | Balzer | |
| 2012/0299404 A1 | 11/2012 | Yamamoto et al. | |
| 2013/0038182 A1* | 2/2013 | Obata | H02K 11/40 384/126 |
| 2013/0071057 A1 | 3/2013 | Fischer et al. | |
| 2016/0023532 A1 | 1/2016 | Gauthier | |
| 2016/0099633 A1 | 4/2016 | Yoshinori et al. | |
| 2016/0209099 A1 | 7/2016 | Liu | |
| 2019/0118610 A1 | 4/2019 | Johnston | |
| 2020/0350796 A1 | 11/2020 | Yang | |
| 2021/0331554 A1 | 10/2021 | Mancini | |

FOREIGN PATENT DOCUMENTS

| | | |
|---|---|---|
| CN | 204131349 | 1/2015 |
| CN | 204906069 U | 12/2015 |
| CN | 108180212 | 6/2018 |
| DE | 4333613 | 4/1994 |
| DE | 102013020332 | 7/2014 |
| DE | 102013219186 | 3/2015 |
| EP | 1 114 939 | 7/2001 |
| EP | 2 540 552 | 1/2013 |
| EP | 2 549 626 | 1/2013 |
| EP | 2 667 486 | 11/2013 |
| EP | 2 977 254 | 1/2016 |
| GB | 2509308 | 7/2014 |
| JP | 56-113223 U | 9/1981 |
| JP | 61-88467 | 5/1986 |
| JP | 02-33569 U | 8/1988 |
| JP | 10-285876 | 10/1998 |
| JP | 2000-316251 | 11/2000 |
| JP | 2000316251 A * | 11/2000 |
| JP | 2001-197705 | 7/2001 |
| JP | 2001-238406 | 8/2001 |
| JP | 2006-074930 | 3/2006 |
| JP | 2007-300800 | 11/2007 |
| JP | 2008-290636 | 12/2008 |
| JP | 4447410 | 4/2010 |
| JP | 2010-172132 | 8/2010 |
| JP | 2011-097784 | 5/2011 |
| JP | 2011-166866 | 8/2011 |
| JP | 2011-200038 | 10/2011 |
| JP | 2013-027246 | 2/2013 |
| JP | 2013-038998 | 2/2013 |
| JP | 2014-082841 | 5/2014 |
| WO | WO 12/026044 | 3/2012 |
| WO | WO 12/176052 | 12/2012 |
| WO | WO 13/136405 | 9/2013 |

OTHER PUBLICATIONS

International Search Report and Written Opinion; International Application No. PCT/US2017/036290; dated Jul. 25, 2017; 12 pgs.
International Search Report and Written Opinion: International Application No. PCT/US2017/036300; dated Sep. 15, 2017; 14 pgs.

* cited by examiner

ELECTRIC MOTOR ROTOR DISCHARGE PROTECTION

CROSS-REFERENCE TO RELATED APPLICATION

The present application is a divisional of, and claims priority to, U.S. patent application Ser. No. 15/827,363 titled "ELECTRIC MOTOR ROTOR DISCHARGE PROTECTION" and filed on Nov. 30, 2017. U.S. patent application Ser. No. 15/827,363 claims priority pursuant to 35 U.S.C. § 120 and U.S.C. § 365(c) as a continuation of International Application Serial Number PCT/US2017/036300, entitled "ELECTRIC MOTOR ROTOR DISCHARGE PROTECTION", filed 7 Jun. 2017, which claims priority pursuant to 35 U.S.C. § 119(e) to U.S. Provisional Patent Application No. 62/346,741, entitled "ELECTRIC MOTOR COOLING SYSTEM AND ROTOR DISCHARGE PROTECTION', filed 7 Jun. 2016. Each of the above-recited applications are incorporated herein by reference in their entirety and made part of the present application for all purposes.

BACKGROUND

Technical Field

The present invention relates to electric motors; and more particularly to the protection of electric motors from common mode rotor discharge.

Description of Related Art

An electric motor includes a case, a rotor having a rotor shaft and rotor windings (and/or one or more permanent magnets), a stator having stator windings, one or more main rotor bearing(s) coupling the rotor shaft to the case, and various electrical connections. Multiple phase electric motors accumulate charge on their rotors because of imperfect balancing of the multiple phases of the stator. The accumulation of charge on the rotor causes a common mode voltage on the rotor relative to the case. The charge corresponding to the common mode voltage build up on the rotor seeks the case due to a voltage differential therebetween. When the common mode voltage reaches sufficient magnitude, charge conducts across the main rotor bearing(s) (arcing across lubricating oil and the rotor bearing components) and, over time, damages the main rotor bearing(s). One prior art solution to address this problem included the use of conductive brushes mounted perpendicularly to the rotor to shunt the common mode voltage to the case. While this solution was effective at protecting the main rotor bearing(s), the conductive brushes wore relatively quickly, requiring replacement to continue serving their purpose. Replacement required taking the electric motor out of service, repairing it before placing the electric motor back in service. Such operations were expensive and placed the device being powered by the electric motor, e.g., electric car, industrial machine, etc. to be out of service until the repair was complete.

SUMMARY

According to a first embodiment of the present disclosure, an electric motor includes a case, a stator having stator windings coupled to the case, a rotor having a rotor shaft, and at least one main rotor bearing coupling the rotor shaft to the case, wherein the at least one main rotor bearing has a first electrical resistance between the rotor shaft and the case. The electric motor further includes a rotor discharge bearing coupling the rotor shaft to the case. The rotor discharge bearing has a second electrical resistance between the rotor shaft and the case, the second electrical resistance less than the first electrical resistance to direct rotor discharge through the rotor discharge bearing.

With the electric motor of the first embodiment of the present disclosure, common mode charge that builds up on the rotor due to imbalance in the stator windings of a multi-pole electric motor is discharged via the rotor discharge bearing instead of via the main rotor bearing(s). Thus, the main rotor bearing(s) is/are substantially protected from common mode rotor discharge, extending its/their life span and, resultantly, extending the time for required servicing.

The electric motor may include a number of additional features and structures. These features and structures may be included in various combinations that include some of these features and structures, all of these features and structures, or one of these features and structures. The electric motor may further include stator drive electronics coupled to the stator and configured to excite the stator.

With one embodiment of the electric motor, the at least one main rotor bearing and the rotor discharge bearing couple between an outer surface of the rotor shaft and the case. In an alternate configuration, the at least one main rotor bearing couples between an outer surface of the rotor shaft and the case and the rotor discharge bearing couples between an inner surface of the rotor shaft and the case via electrical connection between the rotor discharge bearing and the case.

With one structure, the at least one main rotor bearing has a first diameter and the rotor discharge bearing has a second diameter that differs from the first diameter. With another structure, the at least one main rotor bearing has a first construct while the rotor discharge bearing has a second construct that differs from the first construct. The at least one main rotor bearing may have a first loading and the rotor discharge bearing may have a second loading that is different from the first loading. With any of these various structures, both the at least one main rotor bearing and the rotor discharge bearing are configured to rotate about a longitudinal axis of the rotor shaft.

According to a second embodiment of the present disclosure, a method for operating an electric motor having a case, a stator, a rotor having a rotor shaft, at least one main rotor bearing, and a rotor discharge bearing includes powering the stator to create a rotating magnetic field. The method then includes collecting common mode charge on the rotor caused by the rotating magnetic field and discharging the common mode charge via the rotor discharge bearing. With these operations, the at least one main rotor bearing has a first electrical resistance between the rotor shaft and the case and the rotor discharge bearing has a second electrical resistance between the rotor shaft and the case, the second electrical resistance less than the first electrical resistance. With the method of the second embodiment, the at least one main bearing is substantially protected from common mode rotor discharge, extending its/their life span and, resultantly, extending the time for required servicing.

The method of operating the electric motor may include a number of additional operations and/or features. These operations and/or features may be included in various combinations that include some of these operations and/or features, all of these operations and/or features, or one of these operations and/or features. The method may further include the at least one main rotor bearing coupling between an outer surface of the rotor shaft and the case and the rotor discharge bearing coupling between an outer surface of the rotor shaft and the case. The method may further include a main rotor bearing having a first diameter and the rotor discharge bearing having a second diameter that is different from the first diameter. The method may further include a main rotor bearing having a first construct and the rotor discharge bearing having a second construct that differs from the first construct. The method may further include a main rotor bearing having a first loading and the rotor discharge bearing having a second loading that differs from the first loading.

According to a third embodiment of the present disclosure, an electric motor includes a case, a stator having stator windings coupled to the case, a rotor having a rotor shaft and rotor windings that rotate about a longitudinal axis of the rotor shaft, at least one main rotor bearing coupling the rotor shaft to the case, and a rotor discharge brush coupled between the case and the rotor shaft along the longitudinal axis of the rotor shaft. With the electric motor of the third embodiment of the present disclosure, the common mode charge that builds up on the rotor due to imbalance in the stator windings of a multi-pole electric motor is discharged via the rotor discharge brush instead of via the main rotor bearing(s). Thus, the main bearing(s) is/are substantially protected from common mode rotor discharge, extending its/their life span and, resultantly, extending the time for required servicing.

The electric motor may include a number of additional features and structures. These features and structures may be included in various combinations that include some of these features and structures, all of these features and structures, or one of these features and structures. The electric motor may further include further stator drive electronics coupled to the stator and configured to excite the stator.

The electric motor of the third embodiment may also include stator drive electronics coupled to the stator and configured to excite the stator. With the electric motor, the rotor discharge brush may include a carbon fiber portion in contact with the rotor shaft. Further, the rotor discharge brush may include a first portion in contact with the rotor shaft and a second portion connected between the first portion and the case. The first portion may have a first diameter and the second portion may have a second diameter that differs from the first diameter.

According to a fourth embodiment of the present disclosure, a method for an electric motor having a case, a stator, a rotor having a rotor shaft, at least one main rotor bearing, and a rotor discharge brush includes powering the stator to create a rotating magnetic field that causes the rotor to rotate about a longitudinal axis of the rotor shaft. The method then includes collecting common mode charge on the rotor caused by the rotating magnetic field and discharging the common mode charge via the rotor discharge brush along the longitudinal axis of the rotor shaft. Thus, the main bearing(s) is/are substantially protected from common mode rotor discharge, extending their life span and, resultantly, extending the time for required servicing.

The method of operating the electric motor may include a number of additional operations and/or features. These operations and/or features may be included in various combinations that include some of these operations and/or features, all of these operations and/or features, or one of these operations and/or features. With these operations, the at least one main rotor bearing may have a first electrical resistance between the rotor shaft and the case and the rotor discharge brush has a second electrical resistance between the rotor shaft and the case, the second electrical resistance less than the first electrical resistance. The method may further include discharging the common mode charge via the rotor discharge brush by the common mode charge crossing from the rotor shaft to a carbon fiber portion of the rotor discharge bearing that is in contact with the rotor shaft.

According to a fifth embodiment, the electric motor couples to a gear box with the rotor shaft coupling to a gear box shaft. In such case, a single main rotor bearing couples the rotor shaft to the case. Two gear box main bearings couples between the gear box shaft and a case of the gear box. The rotor shaft couples to the gear box shaft such that the gear box shaft supports the rotor shaft, i.e., one of the gear box main bearings directly supports the gear box shaft and indirectly supports the rotor shaft. With the fifth embodiment, the electric motor includes a rotor discharge bearing coupled to the rotor shaft to shunt common mode charge from the rotor shaft.

According to a sixth embodiment, the electric motor couples to a gear box with the rotor shaft coupling to a gear box shaft. In such case, a single main rotor bearing couples the rotor shaft to the case. Two gear box main bearings couples between the gear box shaft and a case of the gear box. The rotor shaft couples to the gear box shaft such that the gear box shaft supports the rotor shaft, i.e., one of the gear box main bearings directly supports the gear box shaft and indirectly supports the rotor shaft. With the sixth embodiment, the gear box and/or the electric motor includes a rotor discharge brush coupled to the rotor shaft to shunt common mode charge from the rotor shaft and/or the gear box shaft.

DETAILED DESCRIPTION OF THE DISCLOSURE

Figure 1:
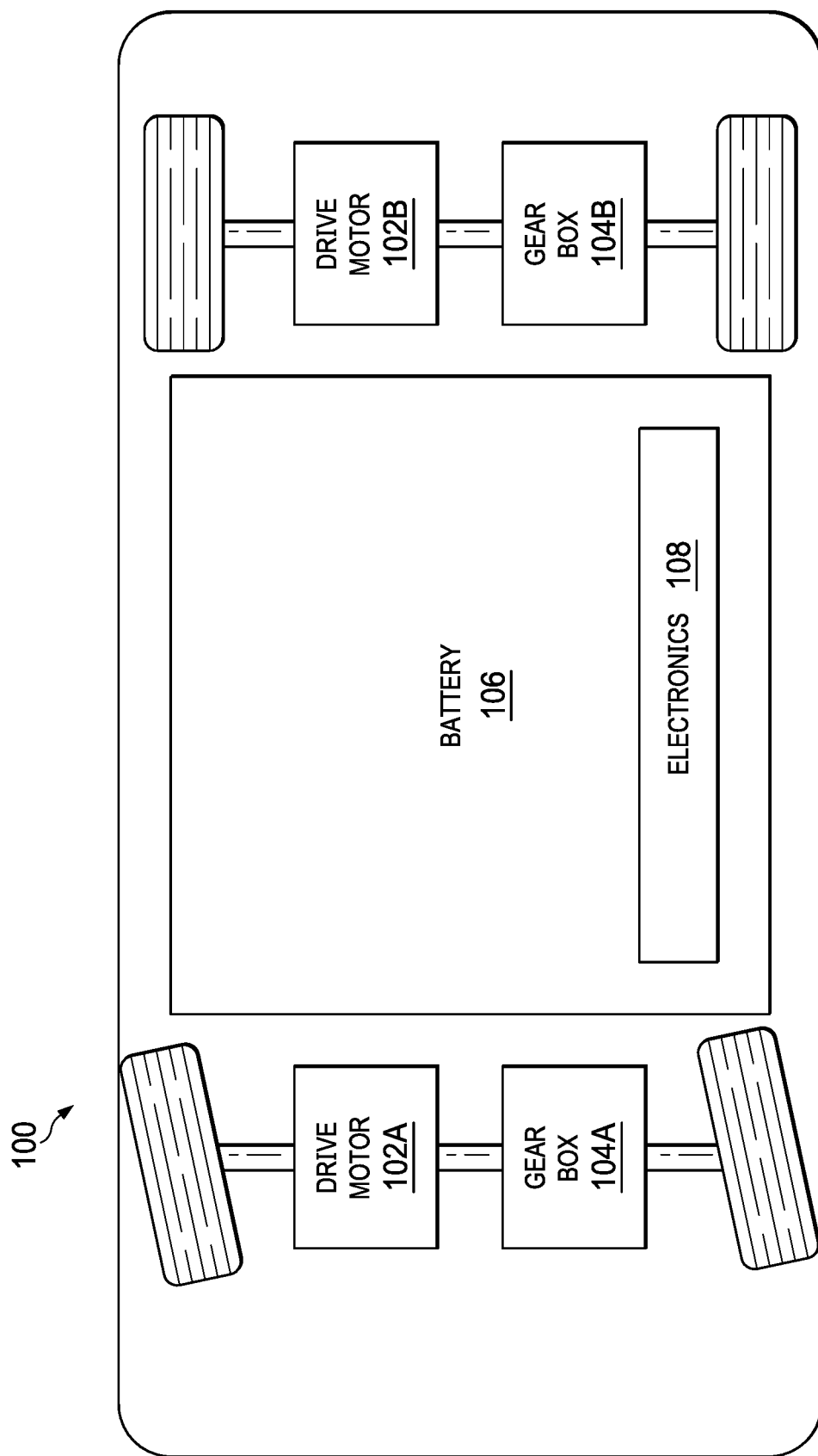
FIG. 1 illustrates the basic components of a battery powered electric vehicle.

FIG. 1 illustrates the basic components of a battery powered electric vehicle (electric vehicle) 100. The electric vehicle 100 includes at least one drive motor (traction motor) 102A and/or 102B, at least one gear box 104A and/or 104B coupled to a corresponding drive motor 102A and/or 102B, a battery 106 and electronics 108 (including drive motor electronics). Generally, the battery 106 provides electricity to the electronics 108 of the electric vehicle 100 and to propel the electric vehicle 100 using the drive motor 102A and/or 102B. The electric vehicle 100 includes a large number of other components that are not described herein but known to one or ordinary skill. While the construct of the electric vehicle 100 of FIG. 1 is shown to have four wheels, differing electric vehicles may have fewer or more than four wheels. Further, differing types of electric vehicles 100 may incorporate the inventive concepts described herein, including motor cycles, aircraft, trucks, boats, train engines, among other types of vehicles.

Various operational issues with the electric vehicle 100 are described herein in conjunction with various embodiments. One of these operational issues relates to the collection of common mode charge on the rotors of the drive motors 102A and 102B. Differing embodiments are disclosed herein to address dissipation of the common mode charge collected on the rotors of the drive motor 102A or 102B that safely dissipate the charge without damaging main rotor bearing(s) of the drive motors 102A and 102B. The structures and operations described herein also apply to electric motors that service differing machinery, e.g., industrial equipment, residential equipment, commercial equipment, etc.

Figure 2:
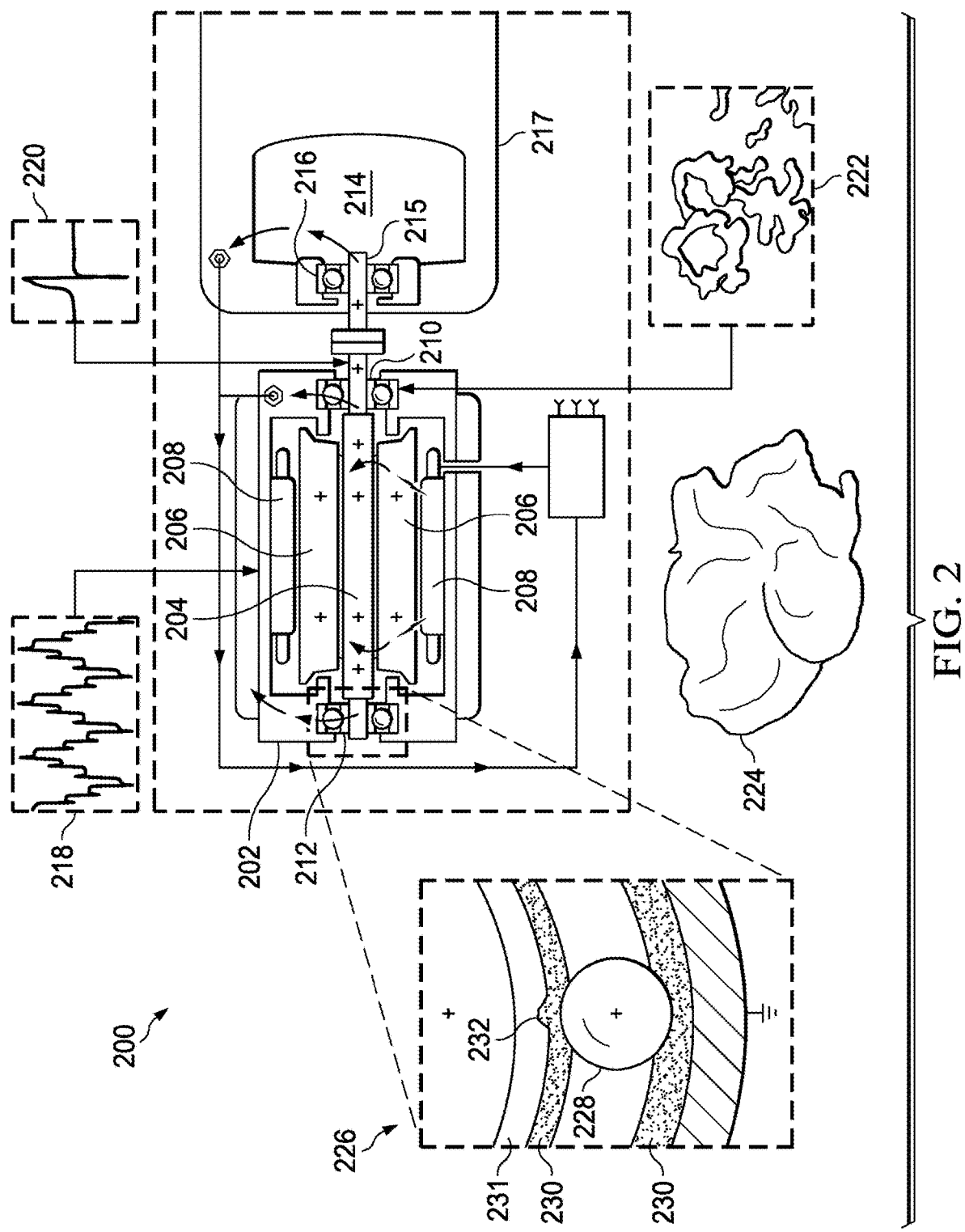
FIG. 2 illustrates rotor discharge through the main rotor bearing(s) of an electric motor.

FIG. 2 illustrates rotor discharge through the main rotor bearing(s) of an electric motor. The electric motor 200 includes a case 202, a stator 208 contained within the case 202, a rotor having a rotor shaft 204 and rotor windings 206 located within the stator 208 and rotating coupled to the case 202 via a first main rotor bearing 210 and a second main rotor bearing 212. Alternately, the rotor may include permanent magnets instead of the rotor windings 206 or be a combination of permanent magnets and rotor windings 206. The electric motor 200 drives a load 214, which may be a gear box 104A or 104B of an electric vehicle 100 as shown in FIG. 1 or another load such as an industrial machine, a commercial machine, or a consumer machine. A shaft 215 of the load couples to the rotor shaft 204. Rotor bearing 216 allows the shaft 215 of the load 214 to rotate within a housing 217.

The stator 208 is powered by an electric waveform 218 produced by stator drive electronics. Note that the waveform 218 approximates a sine wave but includes harmonic components introduced by one or more inverters of the stator drive electronics, for example. The stator 208 includes multiple phases, each being powered by a respective electric waveform 218. In a multiple pole electric motor 200, the respective waveforms will be out of phase from each other. The multiple phases of the stator 208 are typically not perfectly balanced. This imbalance induces a common mode voltage on the rotor shaft 204 caused by waveform 220, for example, which, over time, causes the rotor shaft 204 and rotor windings 206 (and/or permanent magnets) to collect a common mode charge. The buildup in common mode charge on the rotor shaft 204 and rotor windings 206 results in a common mode voltage on the rotor shaft 204 with respect to the case 302 of the electric motor 200.

Blow up 226 of FIG. 2 illustrates a portion of the main rotor bearing 212 showing the effects of discharge of the common mode voltage across the main rotor bearing 212. Shown in the blow up 226 are components of the main rotor bearing 212, including ball/roller 228, inner ring 231, and grease 230. When the common mode voltage reaches a sufficient level, the common mode charge arcs from an outer ring (not shown) to the inner ring 231 of the main rotor bearing 212 via the grease 230 and the ball/roller 228. Such discharge results in burning of the grease 230 and electric discharge pitting 232 of the main rotor bearing (shown on inner ring 231). Electric discharge pitting 232 creates metal particles, e.g., 224 formed from electric discharge pitting 232 of the inner ring 231 and/or outer ring. The metal particles 224 remain in the grease 230 as shown in detail 222. These metal particles 224 in the grease 230 along with the grease 230 being degraded by burning causes the main rotor bearing 212 to have increased friction to resist rotation of the rotor shaft 204 and increased heat generation by the increased friction, eventually leading to poor performance and increased noise of the electric motor 200 and requiring replacement of the main rotor bearing(s) 210 and 212.

Figure 3:
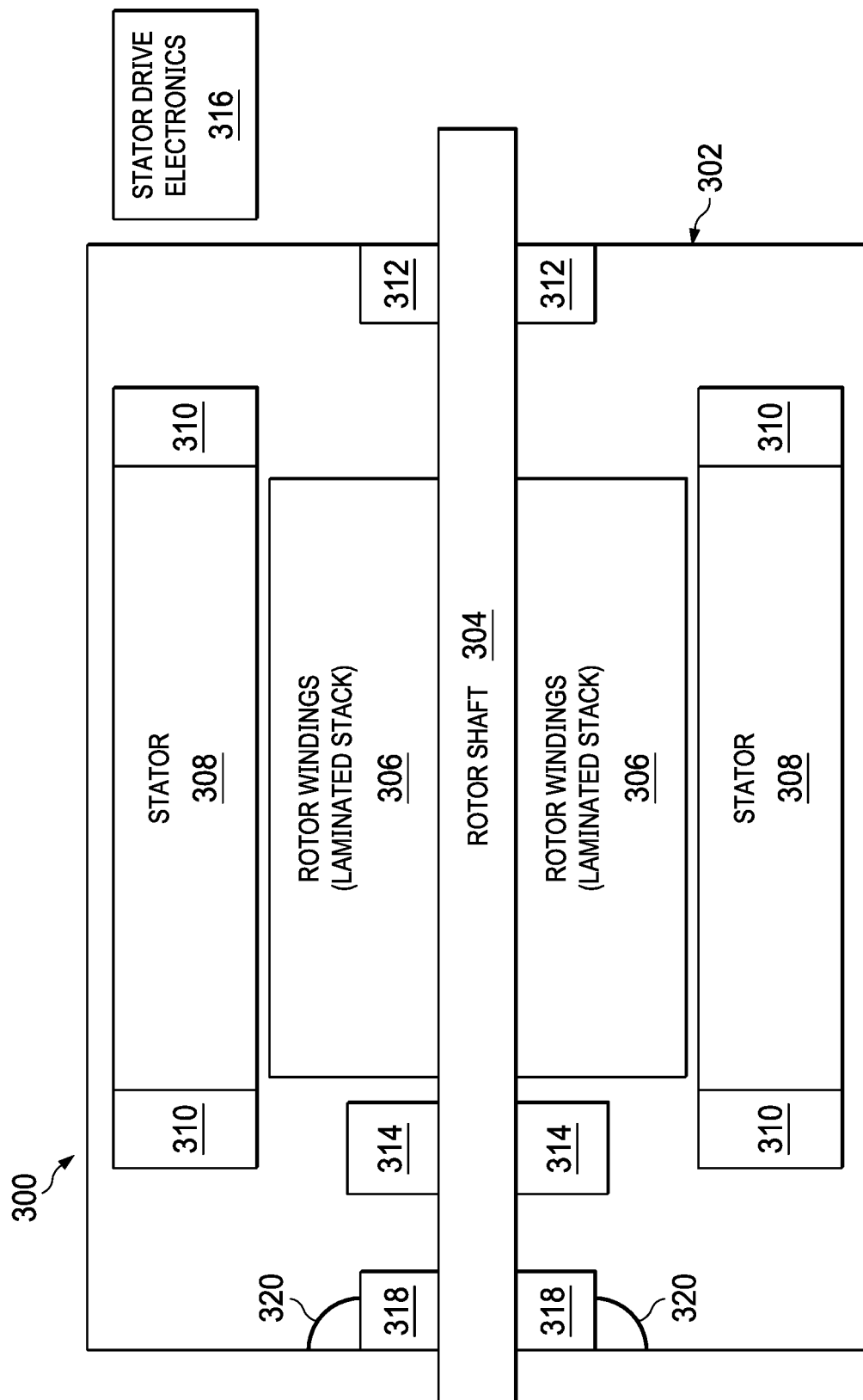
FIG. 3 illustrates a first embodiment of an electric motor constructed and operating according to a disclosed embodiment.
Figure 11:
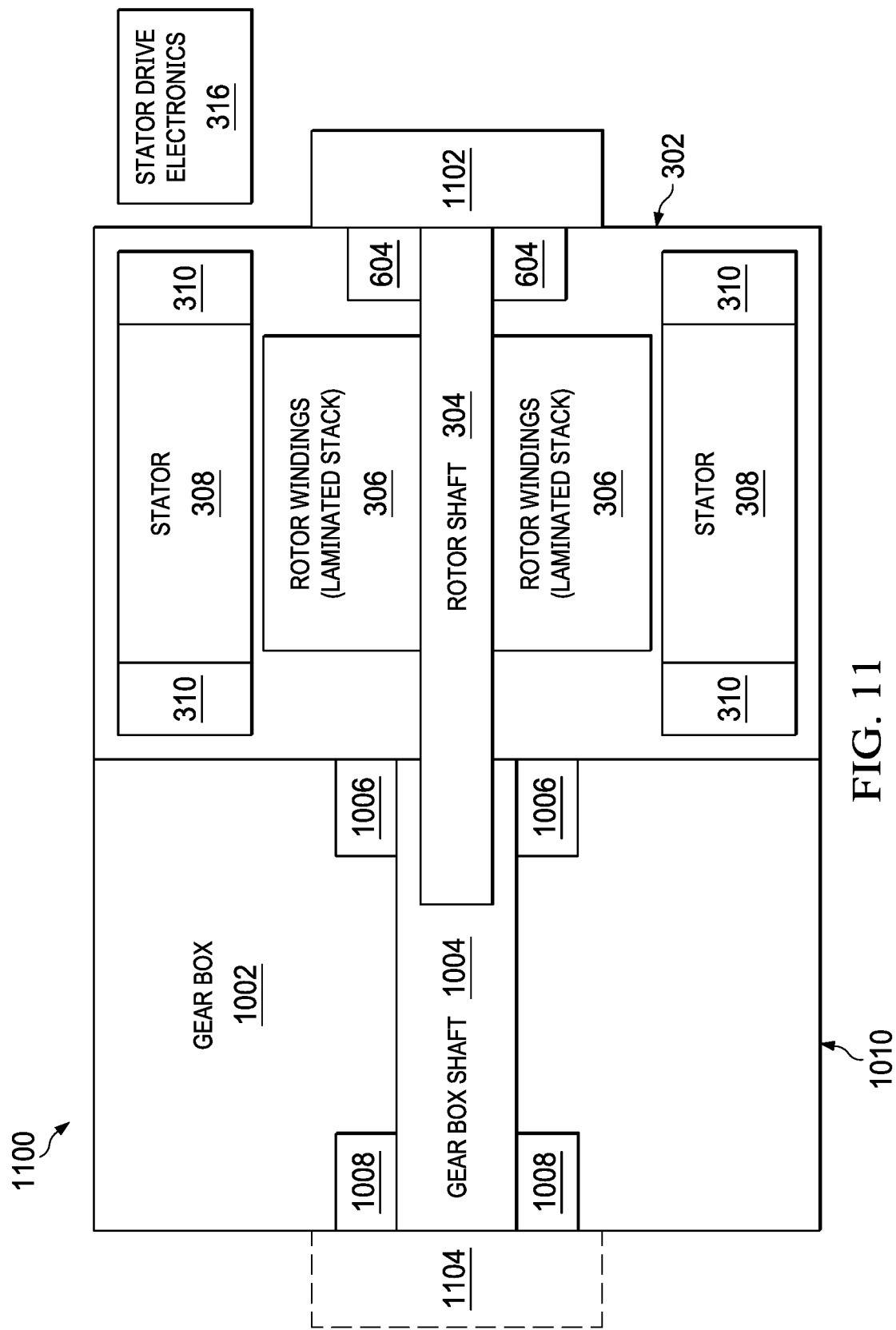
FIG. 11 illustrates a sixth embodiment of an electric motor constructed and operating according to a disclosed embodiment.

FIG. 3 illustrates a first embodiment of an electric motor constructed and operating according to a disclosed embodiment. The electric motor 300 includes a case 302 and a stator coupled to the case 302 having stator windings 308 and stator end-windings 310. The electric motor 300 further includes a rotor having a rotor shaft 304 and rotor windings 306 and main rotor bearing 312 and 314 coupling the rotor shaft 304 to the case 302. Each of the main rotor bearings 312 and 314 has a first electrical resistance between the rotor shaft 304 and the case 302. The electric motor 300 further includes a rotor discharge bearing 318 coupling the rotor shaft 304 to the case 302 (by electrical connection 320 in some embodiments). The rotor discharge bearing 318 has a second electrical resistance between the rotor shaft 304 and the case 302, the second electrical resistance less than the first electrical resistance to direct rotor discharge through the rotor discharge bearing 318 instead of through the main rotor bearings 312 or 314. The main rotor bearings 312 and 314 and the rotor discharge bearing 318 are configured to rotate about a longitudinal axis of the rotor shaft 304. An alternate embodiment will be illustrated in FIG. 11 showing an embodiment of a motor in which only a single rotor bearing directly couples to the rotor shaft 304 with a second end of the rotor shaft 304 received within a gear box shaft. In such embodiment, the rotor 304 is supported directly by only one main rotor bearing and supported indirectly by a bearing that couples directly to the gear box shaft.

The electric motor 300 further includes stator drive electronics 316 coupled to the stator windings 308 and configured to excite the stator windings 308. As was described with reference to FIG. 2, a wave form created by the stator drive electronics 316 drives the stator windings 308 and the end-windings 310. The electric motor 300 is a multiple phase electric motor. The stator windings 308 are not perfectly distributed or balanced such that common mode charge is induced on the rotor shaft 304. With the electric motor 300 of FIG. 3, the common mode charge is shunted from the rotor shaft 304 to the case 302 via the rotor discharge bearing 318 because the electrical path from the rotor shaft 304 to the case 302 via the rotor discharge bearing 318 has lower resistance than the electrical path from the rotor shaft 304 to the case 302 via either main rotor bearing 312 or 314.

With the embodiment of FIG. 3, the main rotor bearing 312 or 314 have a first diameter and the rotor discharge bearing 318 has a second diameter that differs from the first diameter. Further, in some embodiments, the main rotor bearing 312 and 314 have a first construct while the rotor discharge bearing 318 has a second construct that differs from the first construct.

Further, with the embodiment of FIG. 3 (and other embodiments described herein), the main rotor bearings 312 and 314 has a first loading and the rotor discharge bearing 318 has a second loading that differs from the first loading. The differing loading of the rotor discharge bearing 318 as compared to the loading of the main rotor bearings 312 and 314 causes a layer of grease (or oil such as an automatic transmission fluid or other oil lubricant) separating the moving components (balls/rollers) of the rotor discharge bearing 318 from the stationary components of the rotor discharge bearings 318 to be of a lesser thickness than a layer of grease (or oil) separating the moving components (balls/rollers) of the main rotor bearing 314 and 312 from the stationary components of the main rotor bearings 314 and 312. Because the layers of grease of the main rotor bearings 312 and 314 and the layer of grease of the rotor discharge bearing 318 in large part determine the electrical resistance from the rotor shaft 304 to case 302 of these respective bearings, the relatively thinner layer of grease (or oil) of the rotor discharge bearing 318 causes the electrical resistance of the rotor discharge bearing 318 from the rotor shaft 304 to the case 302 to be less than the electrical resistance of the main rotor bearings 314 and 312 between the rotor shaft 304 and the case 302. This, of course, causes the common mode voltage on the rotor shaft 304 to shunt to the case 302 via the rotor discharge bearing 318 instead of via the main rotor bearings 312 and/or 314.

Figure 4:
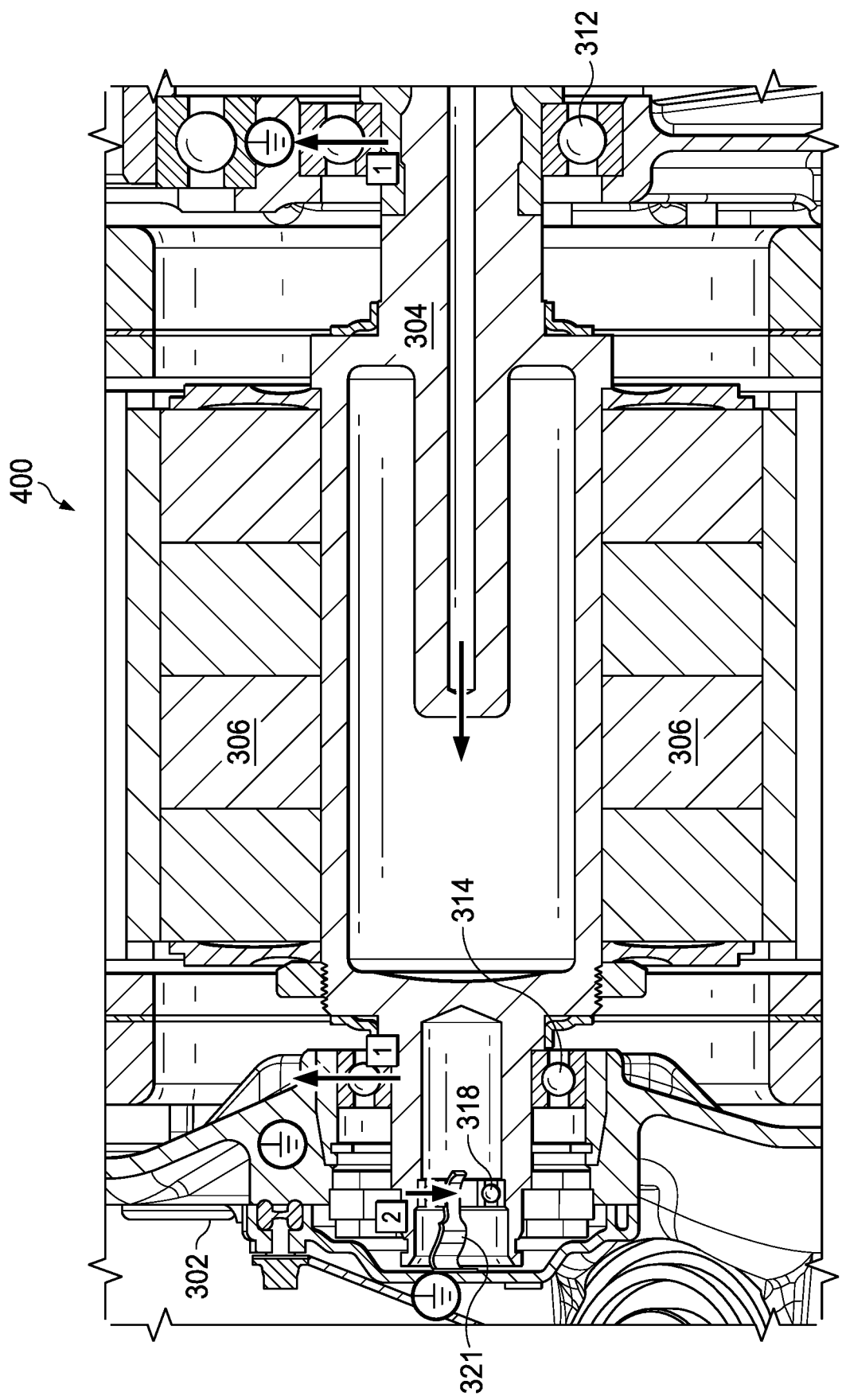
FIG. 4 illustrates a second embodiment of an electric motor constructed and operating according to a disclosed embodiment.

FIG. 4 illustrates a second embodiment of an electric motor constructed and operating according to a disclosed embodiment. Same/similar components of the electric motor 400 share numbering with components of the embodiment of FIG. 3. With the embodiment of FIG. 4, main rotor bearing 312 couples the rotor shaft 304 to the case 302 and rotor bearing 314 couples the rotor shaft 304 to an input gear shaft. The main rotor bearings 312 and 314 each have a first electrical resistance between the rotor shaft 304 and the case 302. Rotor discharge bearing 318 also couples the rotor shaft 304 to the case 302. The rotor discharge bearing 318 has a second electrical resistance between the rotor shaft 304 and the case 302, the second electrical resistance less than the first electrical resistance. In the embodiment of FIG. 4, the main rotor bearings 312 and 314 couple between an outer surface of the rotor shaft 304 and the case 302 while the rotor discharge bearing 318 couples to the rotor shaft 304 on an inner surface of the rotor shaft 304 within a corresponding substantially cylindrical opening of the rotor shaft 304. The rotor discharge bearing 318 couples to the case 302 via a conductive tab 321, which serves as the electrical connection 320. Because the electrical resistance from the rotor shaft 304 to the case 302 through the rotor discharge bearing 318 is less than the electrical resistance from the rotor shaft 304 to the case 302 through either of the main rotor bearings 312 or 314, the common mode voltage that builds up on the rotor shaft 304 discharges across the rotor discharge bearing 318 instead of the main rotor bearings 312 or 314. The main rotor bearings 312 and 314 and the rotor discharge bearing 318 all are concentrically oriented about a longitudinal axis of the rotor shaft 304.

According to one aspect of the embodiment of FIG. 3, one or both of the main rotor bearings 312 or 314 has a first diameter and the rotor discharge bearing 318 has a second diameter that differs from the first diameter. According to another aspect, the main rotor bearings 312 and 314 have a first construct and the rotor discharge bearing 318 has a second construct that differs from the first construct. The main rotor bearings 312 and 314 and the rotor discharge bearing 318 may be ball bearings or roller bearings. However, the size of the balls/rollers and the depth of the grooves in inner and outer rings of the rotor discharge bearing 318 as compared to the main rotor bearings 312 and 314 may differ to cause the differing electrical resistances. According to yet another embodiment, the main rotor bearings 312 and 314 have a first loading and the rotor discharge bearing 318 has a second loading that is different from the first loading. Differing size of the main rotor bearings 312 and 314 versus the rotor discharge bearing 318 contributes or causes a differing load between the bearings. With each of the embodiments, the differing construct, sizes, and loadings cause the electrical resistance of the rotor discharge bearing 318 between the rotor shaft 304 and the case 302 to be less than the electrical resistance of either of the main rotor bearings 312 and 314 between the rotor shaft 304 and the case 302, causing the common mode voltage of the rotor shaft 304 to discharge through the rotor discharge bearing 318 instead of the main rotor bearing(s) 312 and 314.

Figure 5:
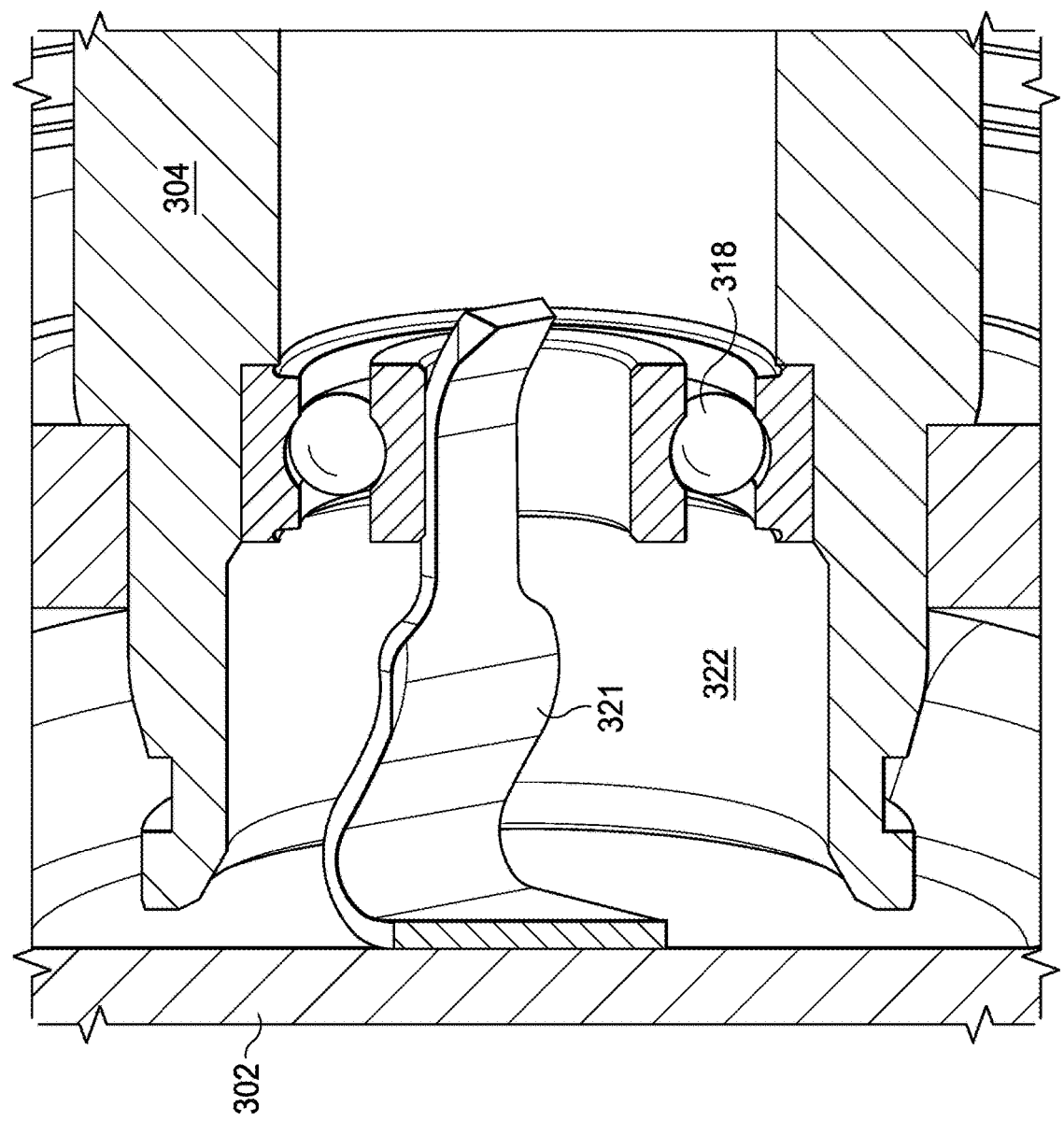
FIG. 5 illustrates details of a rotor discharge bearing of FIG. 4.

FIG. 5 illustrates details of the rotor discharge bearing of FIG. 4. The rotor discharge bearing 318 mounts on an inner surface 322 of the rotor shaft 304. This inner surface 322 results from removal of a substantially cylindrical portion of the rotor shaft 304 about the longitudinal axis of rotation of the rotor shaft 304. The rotor discharge bearing 318 couples to the case 302 via conductive tab 321, which serves as the electrical connection 320 shown in FIG. 3. The electrical path from the rotor shaft 304 through the rotor discharge bearing 318 and the conductive tab 321 to the case 302 causes the common mode voltage that builds up on the rotor shaft 304 to discharge via the rotor discharge bearing 318 instead of via the main rotor bearing(s) 312 or 314.

Figure 6:
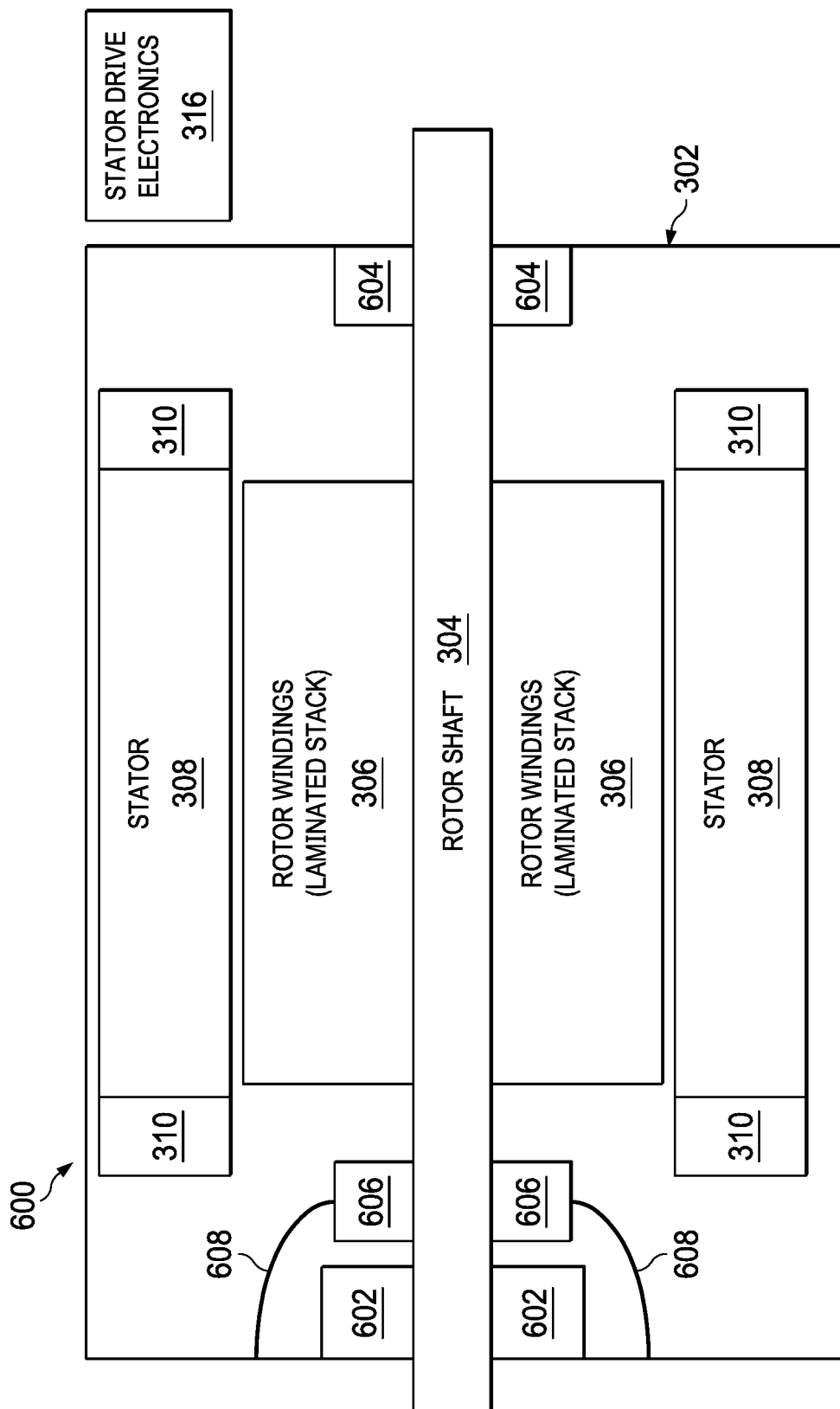
FIG. 6 illustrates a third embodiment of an electric motor constructed and operating according to a disclosed embodiment.

FIG. 6 illustrates a third embodiment of an electric motor constructed and operating according to a disclosed embodiment. Same/similar components of the electric motor 600 share numbering with the embodiments of FIGS. 3, 4 and 5. With the embodiment of the electric motor 600 of FIG. 6, the main rotor bearings 602 and 604 couple between an outer surface of the rotor shaft 304 and the case 302 and a rotor discharge bearing 606 also couples between an outer surface of the rotor shaft 304 and the case 302 (via electrical connection 608). As compared to the embodiments of FIGS. 4 and 5 in which the rotor discharge bearing 318 coupled to the rotor shaft 304 on an inner surface of the rotor shaft 304, both the main rotor bearings 604 and 606 and the rotor discharge bearing 602 couple to an outer surface of the rotor shaft 304.

With the various embodiments of FIG. 3 through FIG. 6, the rotor discharge bearings 318 and/or 606 may have differing constructs. With a first embodiment of the rotor discharge bearings 318 and/or 606, oil flows around and into the rotor discharge bearings 318 and/or 606 forming an oil layer between the rings of the bearing 318 and/or 606 and the ball/roller. The oil acts as an insulator and the common mode charge on the rotor shaft 304 must discharge across the oil layer. Thus, with this embodiment of the rotor discharge bearings 318 and/or 606, constructs of the rotor discharge bearings 318 and/or 606 cause a thinner oil layer for reduced electrical resistance through the rotor discharge bearings 318 and/or 606 as compared to a relatively thicker oil layer on the moving parts of the main bearings 312/314 or 602/604.

With a second embodiment of the rotor discharge bearings 318 and/or 606, the rotor discharge bearings 318 and/or 606 are sealed and embedded with conductive grease (or oil) for lubrication. The conductive grease (or oil) has a relatively lower electrical resistance than oil that lubricates the main bearings 312, 314, 602 and 604. Thus, with this embodiment of the rotor discharge bearings 318 and/or 606, the conductive grease aids in discharge across the rotor discharge bearings 318 and/or 606 instead of via the main bearings 312, 314, 602 and 604.

Figure 7:
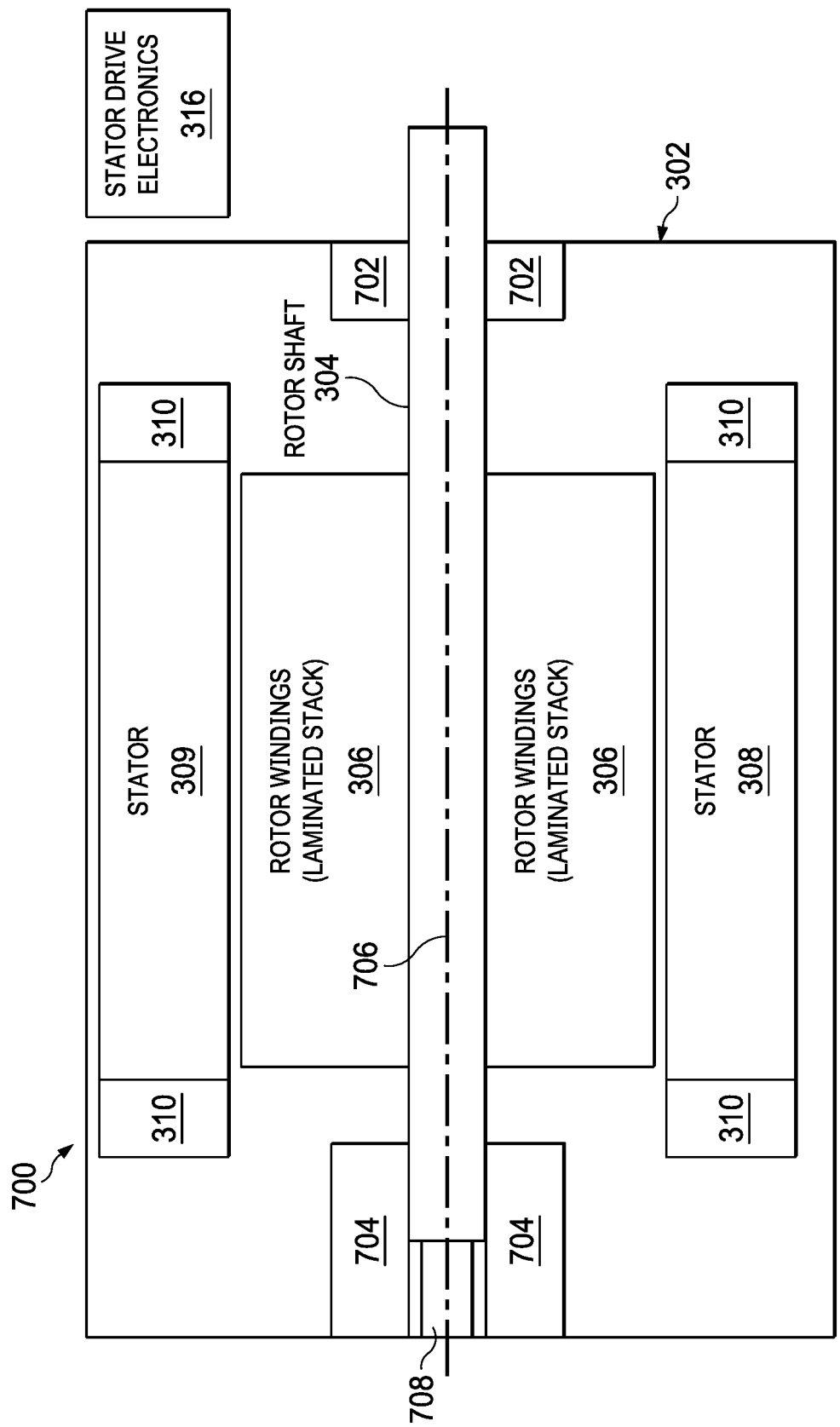
FIG. 7 illustrates a fourth embodiment of an electric motor constructed and operating according to a disclosed embodiment.

FIG. 7 illustrates a fourth embodiment of an electric motor constructed and operating according to a disclosed embodiment. Same/similar components of the electric motor 600 share numbering with the embodiments of FIGS. 3, 4, 5 and 6. The electric motor 700 of FIG. 7 includes a case 302, a stator having stator windings 308 and end-windings 310 coupled to the case 302, and a rotor having a rotor shaft 304 and rotor windings 306, both of which rotate about a longitudinal axis 706 of the rotor shaft 304. The electric motor 700 further includes main rotor bearings 702 and 704 coupling the rotor shaft 304 to the case 302 and a rotor discharge brush 708 coupled between the case 302 and the rotor shaft 304 along the longitudinal axis 706 of the rotor shaft 304. The electric motor 700 further includes stator drive electronics 316 coupled to the stator windings 308 and configured to excite the stator.

With the embodiment of FIG. 7, the rotor discharge brush 708 may include a carbon fiber portion in contact with the rotor shaft 304. Further, the rotor discharge brush 708 may include a first portion in contact with the rotor shaft 304 and a second portion connected between the first portion and the case 302. In such case, the second portion may be a support element and the first portion contacting the rotor shaft 304. Moreover, the first portion of the rotor discharge brush 708 may have a first diameter and the second portion may have a second diameter that differs from the first diameter.

FIGS. 8A, 8B, 8C, and 8D illustrate variations of a rotor discharge brush of the fourth embodiment of FIG. 7. With the embodiment 800 of FIG. 8A, a rotor brush 802 includes a first portion 806 in contact with the rotor shaft 304 and a second portion 804 coupling the first portion 806 to the case 302. With the embodiment 800 of FIG. 8A, the first portion 806 may be constructed of carbon fiber and the second portion 804 may be constructed of a differing electrically conductive material, e.g., metal. The first portion 806 and second portion 806 have differing shapes and differing relative dimensions. First portion 806 is cylindrically shaped while second portion 804 is substantially conically shaped.

Figure 8B:
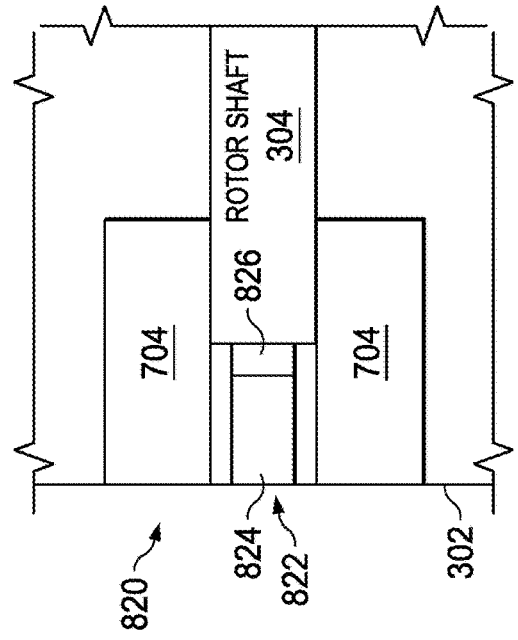
FIGS. 8A, 8B, 8C, and 8D illustrate variations of a rotor discharge brush of the fourth embodiment of FIG. 7.

With the embodiment 820 of FIG. 8B, a rotor brush 822 includes a first portion 826 in contact with the rotor shaft 304 and a second portion 824 coupling the first portion 826 to the case 302. With the embodiment 820 of FIG. 8B, the first portion 826 may be constructed of carbon fiber and the second portion 824 may be constructed of a differing electrically conductive material, e.g., metal. With the embodiment 820 of FIG. 8B, the first portion 826 and the second portion 824 have similar outside dimensions along one axis, e.g., similar diameters when cylindrically formed.

Figure 8D:
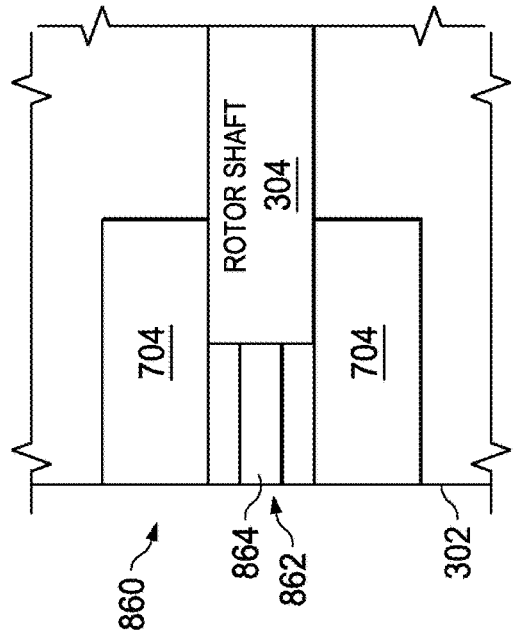
Figure 8A:
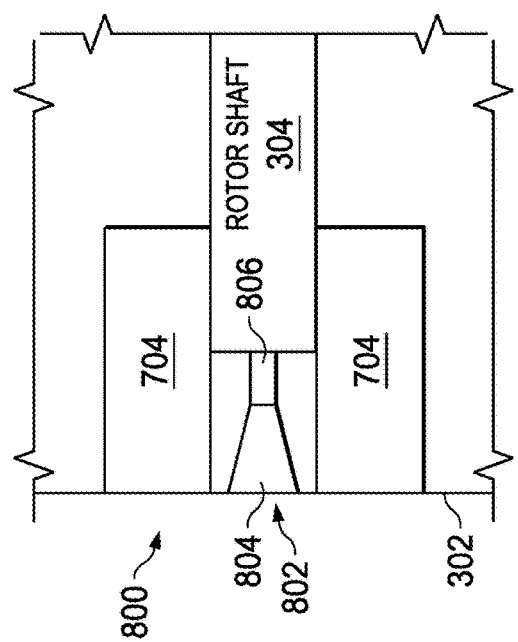
Figure 8C:
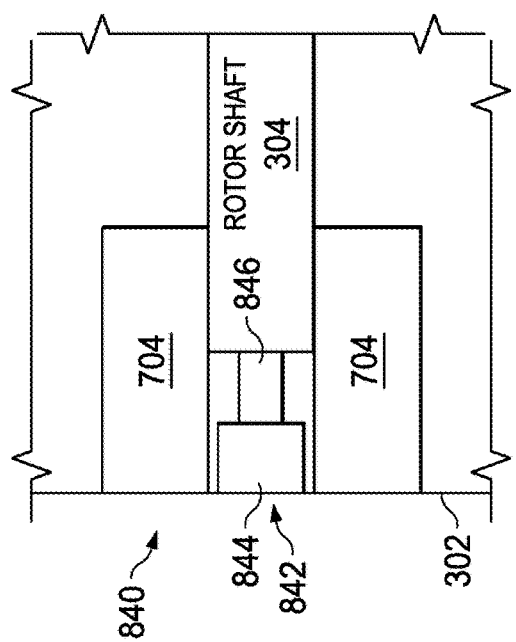

With the embodiment 840 of FIG. 8C, a rotor brush 842 includes a first portion 846 in contact with the rotor shaft 304 and a second portion 844 coupling the first portion 846 to the case 302. With the embodiment 840 of FIG. 8C, the first portion 846 may be constructed of carbon fiber and the second portion 844 may be constructed of a differing electrically conductive material, e.g., metal. With the embodiment 840 of FIG. 8C, the first portion 846 and the second portion 844 have differing outside dimensions along one axis, e.g., differing diameters when cylindrically formed.

With the embodiment 860 of FIG. 8D, a rotor brush 862 includes a single portion 864 extending between the rotor shaft 304 and the case 302 in contact with the rotor shaft 304. With the embodiment 860 of FIG. 8C, the single portion 864 may be constructed of carbon fiber.

Figures 9A, 9B:
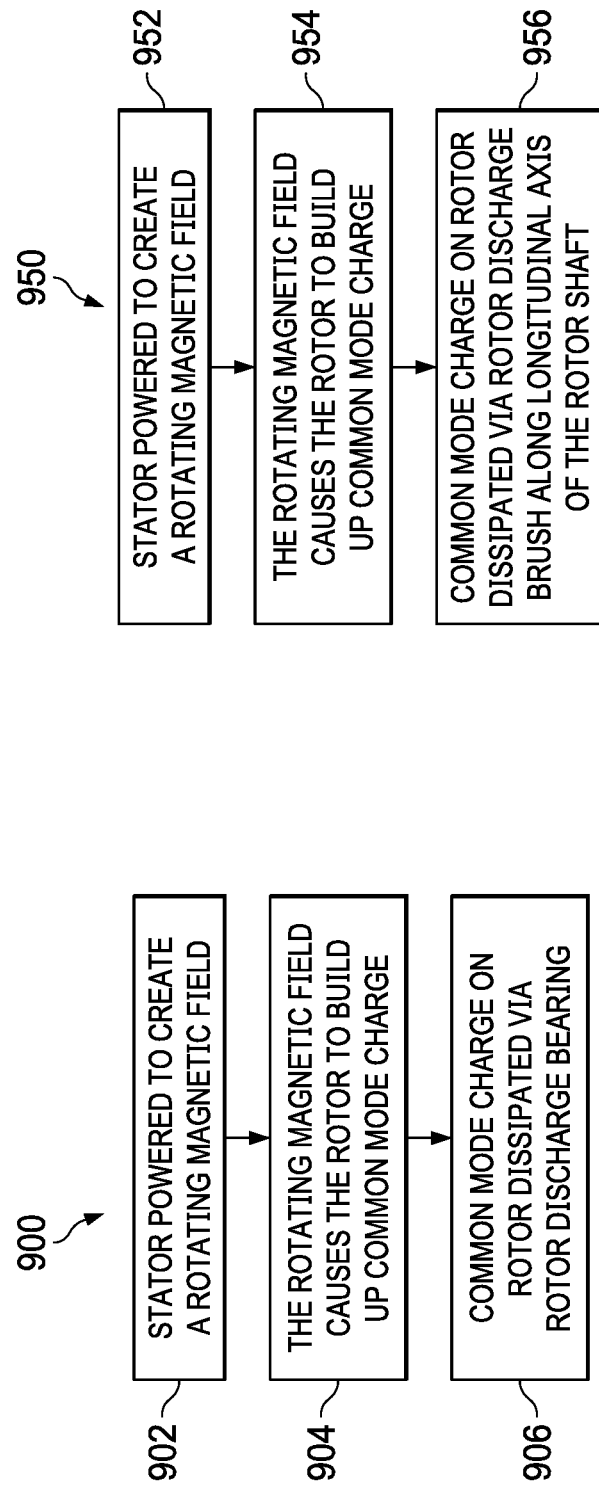
FIGS. 9A and 9B are flow diagrams illustrating rotor discharge operations of an electric motor according to two disclosed embodiments.

FIGS. 9A and 9B are flow diagrams illustrating rotor discharge operations of an electric motor according to two disclosed embodiments. The electric motor has a case, a stator, a rotor having a rotor shaft, at least one main rotor bearing, and a rotor discharge bearing. Referring to FIG. 9A, a first embodiment of operations 900 begins with powering the stator of the electric motor to create a rotating magnetic field (step 902). The electric motor includes a multiple phase stator that has at least minor imbalance of the stator phases causing minor imbalances in the rotating magnetic field. The imbalances in the rotating magnetic field causes the rotor to collect common mode charge (step 904). In order to prevent damage to the main rotor bearing(s) of the electric machine, operations 900 include discharging the common mode charge via a rotor discharge bearing instead of the main rotor bearing(s) (step 906). To cause the operation of step 906, the at least one main rotor bearing has a first electrical resistance between the rotor shaft and the case and the rotor discharge bearing has a second electrical resistance between the rotor shaft and the case, the second electrical resistance less than the first electrical resistance. The various structures previously described herein with reference to FIGS. 3 through 6 may be employed to service the operations 900 of FIG. 9A.

Referring to FIG. 9B, a second embodiment of operations 950 begins with powering the stator of the electric motor to create a rotating magnetic field (step 952). The electric motor includes a multiple phase stator that has at least minor imbalance of the stator phases causing minor imbalances in the rotating magnetic field. The imbalances in the rotating magnetic field causes the rotor to collect common mode charge (step 954). In order to prevent damage to the main rotor bearing(s) of the electric machine, operations 950 include discharging the common mode charge via a rotor discharge brush that orients along a longitudinal axis of the rotor shaft (step 956). To cause the operation of step 956, the at least one main rotor bearing have a first electrical resistance between the rotor shaft and the case and the rotor discharge brush has a second electrical resistance between the rotor shaft and the case, the second electrical resistance less than the first electrical resistance. The various structures previously described herein with reference to FIGS. 7 and 8A-8D may be employed to service the operations 950 of FIG. 9B.

Figure 10:
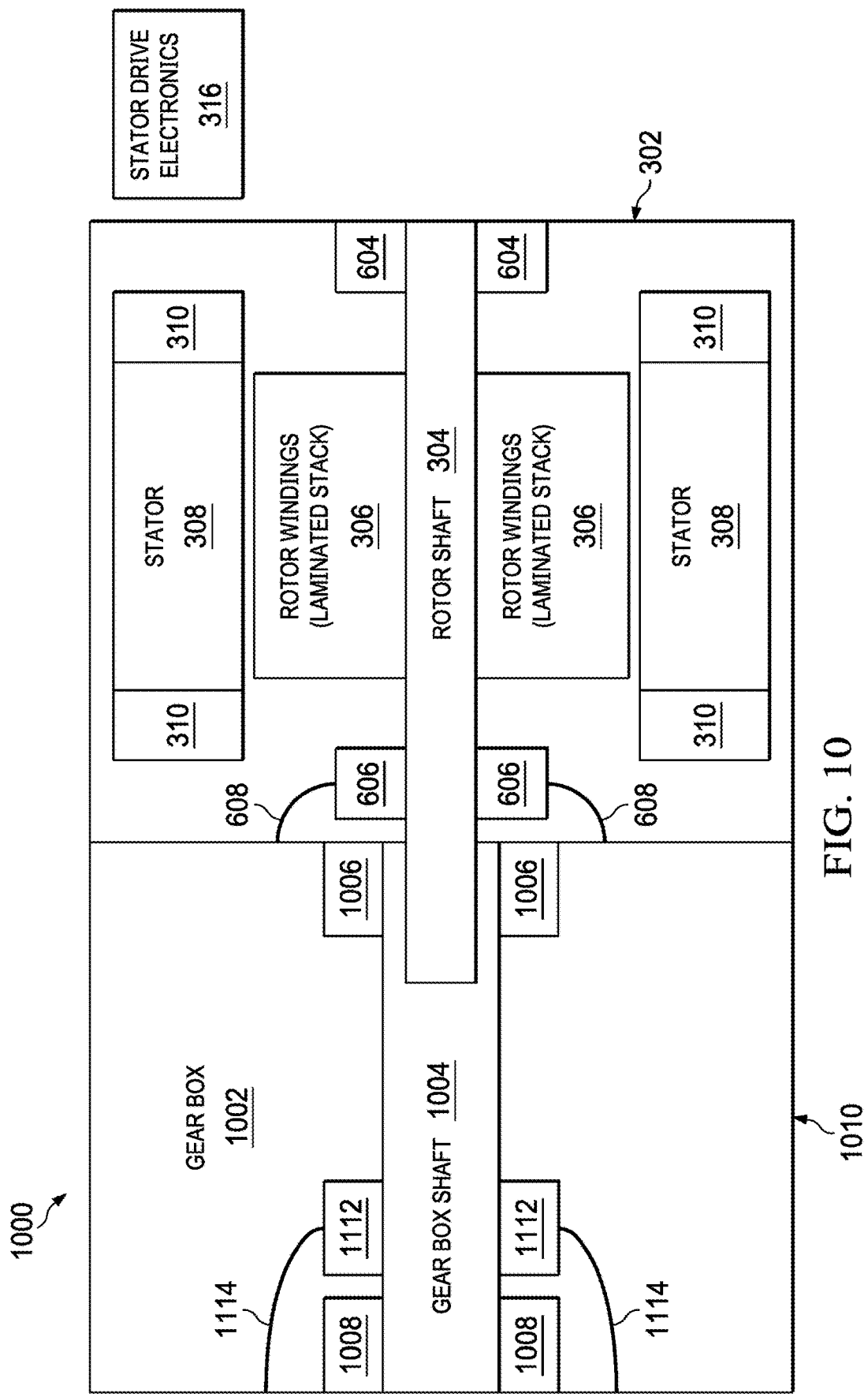
FIG. 10 illustrates a fifth embodiment of an electric motor constructed and operating according to a disclosed embodiment.

FIG. 10 illustrates a fifth embodiment of an electric motor constructed and operating according to a disclosed embodiment. Same/similar components of the electric motor 1000 of FIG. 10 share numbering with the embodiments of FIGS. 3, 4, 5, and 6. With the embodiment of the electric motor 1000 of FIG. 10, the electric motor 1000 couples to gear box 1002. The rotor shaft 304 mates with a gear box shaft 1004 via a spline connection, for example. Thus, because the rotor shaft 304 mates with the gear box shaft 1004, three main bearings 604, 1006 and 1008 jointly service the rotor shaft 304 and the gear box shaft 1004. With the embodiment of FIG. 10, main rotor bearing 604 couples between an outer surface of the rotor shaft 304 and the case 302. Further, main gear box bearings 1006 and 1008 couple between an outer surface of the gear box shaft 1004 and gear box case 1010. Thus, main rotor bearing 604 directly supports the rotor shaft 304, main gear box bearings 1006 and 1008 directly support the gear box shaft 1004, and the main gear box bearings 1006 and 1006 indirectly support the rotor shaft 304.

Rotor discharge bearing 606 couples between an outer surface of the rotor shaft 304 and the case 302 (via electrical connection 608). Alternately, or in addition, a rotor discharge bearing 1112 couples between the gear box shaft 1004 and the gear box case 1010 via electrical connection 1114. The rotor discharge bearing 606 or 1112 may have a construct as was previously described with reference to FIGS. 3-6 herein.

FIG. 11 illustrates a sixth embodiment of an electric motor constructed and operating according to a disclosed embodiment. The embodiment of the electric motor 1100 of FIG. 11 is similar to the embodiment of the electric motor 1000 of FIG. 10 with the difference that the electric motor 1100 of FIG. 11 includes a rotor discharge brush 1102 instead of a rotor discharge bearing. The structure of the rotor discharge brush 1102 may be similar as those described herein with reference to FIG. 7, 8A, 8B, 8C, or 8D. Note that the rotor discharge brush 1102 is shown to couple between the electric motor case 302 and the rotor shaft 304. Alternately, or in addition, another rotor discharge brush 1104 couples between the gear box case 1010 and the gear box shaft 1004.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application.

The invention claimed is:

1. An electric motor comprising:
a case;
a stator having stator windings coupled to the case;
a rotor having a rotor shaft;
at least one main rotor bearing coupling the rotor shaft to the case; and
a rotor discharge brush coupled between the case and the rotor shaft along the longitudinal axis of the rotor shaft, wherein the rotor discharge brush comprises:
a first portion in contact with the rotor shaft; and
a second portion connected between the first portion and the case,
and wherein the first portion has first diameter and the second portion has a second diameter that is larger than the first diameter.

2. The electric motor of claim 1, further comprising stator drive electronics coupled to the stator and configured to excite the stator.

3. The electric motor of claim 1, wherein the rotor discharge brush comprises a carbon fiber portion in contact with the rotor shaft.

4. A method of operating an electric motor having a case, a stator, a rotor having a rotor shaft, at least one main rotor bearing, and a rotor discharge brush, the method comprising:
powering the stator to create a rotating magnetic field that causes the rotor to rotate about a longitudinal axis of the rotor shaft;
collecting common mode charge on the rotor caused by the rotating magnetic field; and
discharging the common mode charge via the rotor discharge brush along the longitudinal axis of the rotor shaft, wherein the rotor discharge brush is coupled between the case and the rotor shaft along the longitudinal axis of the rotor shaft,
wherein the rotor discharge brush comprises:
a first portion in contact with the rotor shaft, and
a second portion connected between the first portion and the case,
and wherein the first portion has first diameter and the second portion has a second diameter that is larger than the first diameter.

5. The method of claim 4, wherein discharging the common mode charge via the rotor discharge brush comprises the common mode charge crossing from the rotor shaft to a carbon fiber portion of the rotor discharge bearing that is in contact with the rotor shaft.

6. The electric motor of claim 1, wherein the rotor discharge brush is formed of different materials, and one of the materials is a carbon fiber, and the other of the materials is an electrically conductive material.

7. The electric motor of claim 1, wherein the electric motor comprises at least two main rotor bearings.

8. The method of claim 4, wherein the rotor discharge brush is formed of different materials, and one of the materials is a carbon fiber, and the other of the materials is an electrically conductive material.

9. The method of claim 4, wherein the electric motor comprises at least two main rotor bearings.

10. The method of claim 4, wherein the rotor discharge brush is formed of different materials, and one of the materials is a carbon fiber, and the other of the materials is an electrically conductive material.

* * * * *